US010088735B1

(12) United States Patent
DeVore et al.

(10) Patent No.: US 10,088,735 B1
(45) Date of Patent: Oct. 2, 2018

(54) SYSTEMS AND METHODS FOR ENHANCING OPTICAL INFORMATION

(71) Applicant: LAWRENCE LIVERMORE NATIONAL SECURITY, LLC, Livermore, CA (US)

(72) Inventors: Peter Thomas Setsuda DeVore, Pleasant Hill, CA (US); Jason T. Chou, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/819,948

(22) Filed: Nov. 21, 2017

Related U.S. Application Data

(62) Division of application No. 15/153,991, filed on May 13, 2016, now Pat. No. 9,857,660.

(60) Provisional application No. 62/162,478, filed on May 15, 2015.

(51) Int. Cl.
| | |
|---|---|
| *G02F 1/35* | (2006.01) |
| *H04B 10/50* | (2013.01) |
| *H04B 10/11* | (2013.01) |
| *G02B 27/28* | (2006.01) |
| *G02B 27/10* | (2006.01) |

(52) U.S. Cl.
CPC ............ *G02F 1/3511* (2013.01); *G02B 27/10* (2013.01); *G02B 27/283* (2013.01); *H04B 10/11* (2013.01); *H04B 10/503* (2013.01)

(58) Field of Classification Search
CPC ... G02F 1/3511; G02B 27/283; H04B 10/503; H04B 10/11
See application file for complete search history.

(56) References Cited

U.S. PATENT DOCUMENTS

| | | |
|---|---|---|
| 5,150,248 A | 9/1992 | Alfano |
| 6,693,734 B2 | 2/2004 | Il et al. |
| 7,031,047 B2 | 4/2006 | Parolari |

(Continued)

FOREIGN PATENT DOCUMENTS

EP 1255157 A1 6/2002

OTHER PUBLICATIONS

Lim et al., "Polarization-Independent Optical Demultiplexing by Conventional Nonlinear Optical Loop Mirror in a Polarization-Diversity Loop Configuration," IEEE Photonics Technology Letters, vol. 12, No. 12, 2000, pp. 1704-1706.

(Continued)

*Primary Examiner* — Daniel Petkovsek
(74) *Attorney, Agent, or Firm* — Eddie E. Scott

(57) ABSTRACT

An Optical Information Transfer Enhancer System includes a first system for producing an information bearing first optical wave that is impressed with a first information having a first information strength wherein the first optical wave has a first shape. A second system produces a second optical wave. An information strength enhancer module receives the first and said second optical waves and impresses the first optical wave upon the second optical wave via cross-phase modulation (XPM) to produce an information-strength-enhanced second optical wave having a second information strength that is greater than the first information strength of the first optical wave. Following a center-wavelength changer by an Optical Information Transfer Enhancer System improves its performance.

10 Claims, 15 Drawing Sheets

(56) References Cited

U.S. PATENT DOCUMENTS

| | | | |
|---|---|---|---|
| 8,934,058 B2 | 1/2015 | Chou et al. | |
| 9,857,660 B1 * | 1/2018 | DeVore | G02F 1/3511 |
| 2002/0176152 A1 | 11/2002 | Parolari | |
| 2004/0197103 A1 | 10/2004 | Roberts | |
| 2016/0054597 A1 | 2/2016 | Von Elm et al. | |

OTHER PUBLICATIONS

Lin et al., "Impact of Fiber Birefringence on Optical Switching with Nonlinear Optical Loop Mirrors," IEEE J. of Selected Topics in Quantum Elec., vol. 10, No. 5, 2000, pp. 1107-1114.

Mahgerefteh et al., "Enhanced Performance of a Mach-Zehnder Wavelength Converter Using a Fiber Bragg Grating", ECOC 98, 20-24, 1998, pp. 663-664.

* cited by examiner

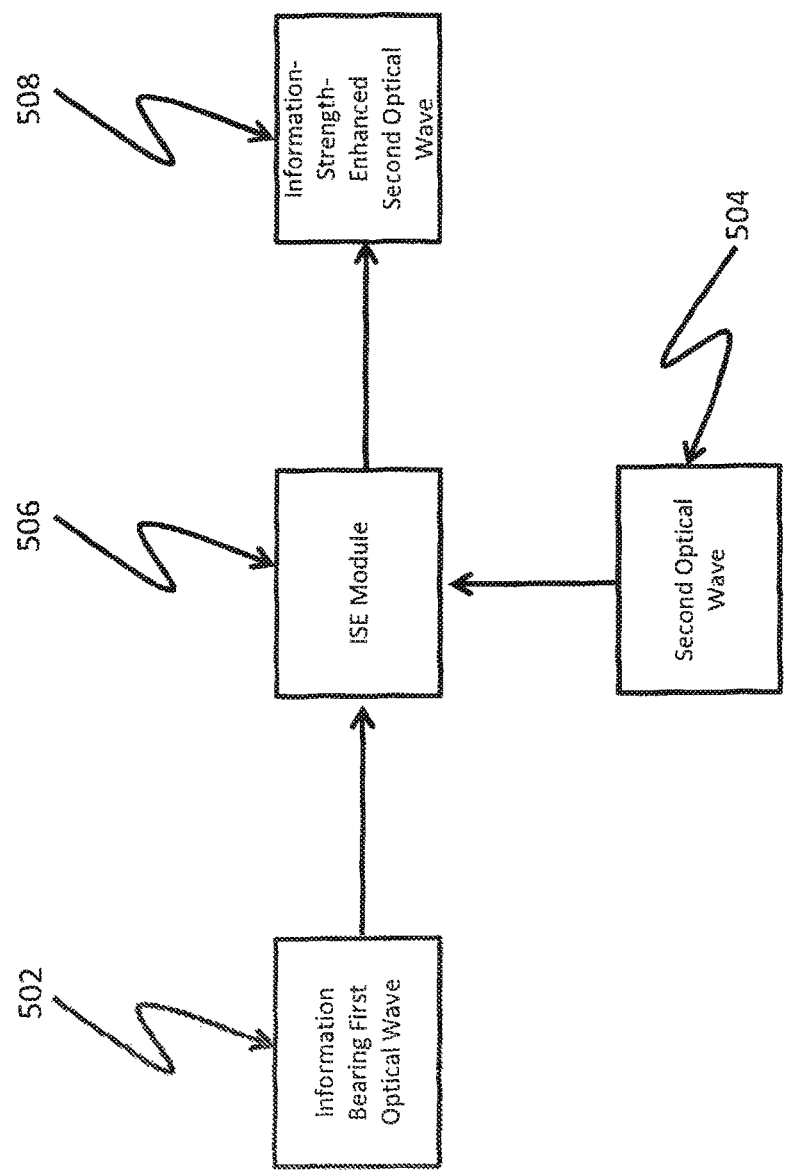

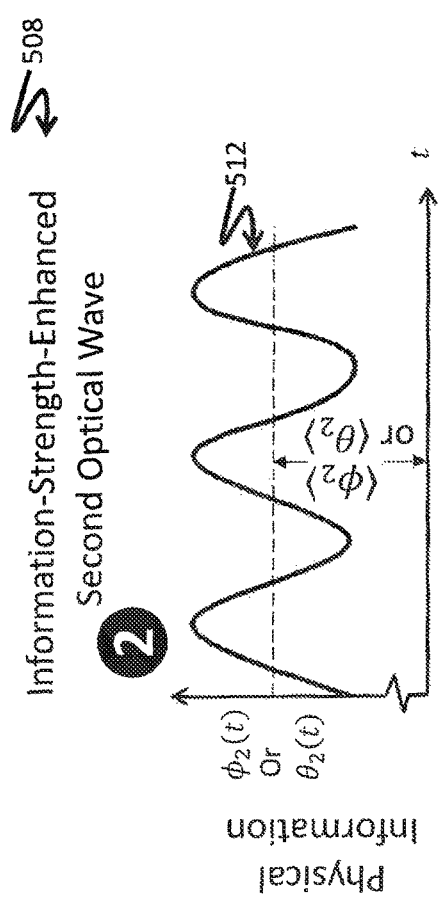
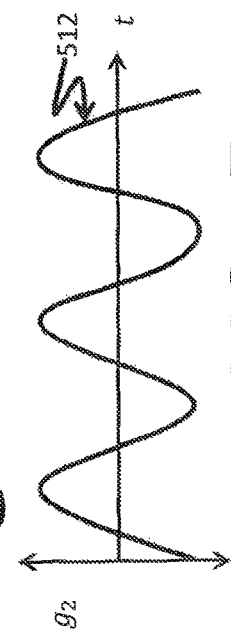
FIG. 5D
FIG. 5E

SYSTEMS AND METHODS FOR ENHANCING OPTICAL INFORMATION

CROSS-REFERENCE TO RELATED APPLICATIONS

The present application is a Division of Application No. 15/153,991 filed May 13, 2016, now U.S. Pat. No. 9,857,660, which claims benefit under 35 U.S.C. § 119(e) of U.S. Provisional Patent Application No. 62/162,478 filed May 15, 2015 entitled "system and method for amplifying optical modulation," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to enhancing information and more particularly to enhancing optical information.

State of Technology

The National Ignition Facility (NIF) is the world's most energetic laser, with the capability to investigate inertial confinement fusion and other high energy density phenomena. NIF often probes materials by impinging strong ultraviolet light onto a hohlraum, creating x-rays that rapidly increase the pressure and temperature of the target. The ultraviolet light is generated by nonlinear optical processes pumped by 1053 nm light. Although effort is made to make the ultraviolet light properties reproducible from shot to shot, the ultraviolet light profile itself is hard to measure directly due to the lack of high speed ultraviolet photodiodes.

Radsensors, which are engineered semiconductors to improve information transfer to optical waves, can transduce x-rays to near-infrared (M. E. Lowry et al., Rev. Sci. Inst. 75, 3995 (2004)). As they are semiconductor materials, ultraviolet absorption can produce electron-hole pairs in place of x-rays, and hence transfer ultraviolet temporal information to optical waves. But Radsensors are very insensitive, and so produce weak information strength on the near-infrared wave. A device that could increase the information strength of the near-infrared wave would then improve the fidelity of the ultraviolet light measurement.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Generally, the inventor's apparatus, systems, and methods are directed to an Optical Information Transfer Enhancer System (OITES) that uses cross-phase modulation (XPM), a well-known ultrafast nonlinear optical phenomenon, to enhance (in some cases by orders of magnitude) the information strength of an optical wave by transferring the information of the optical wave onto another optical wave. It should be noted that the first optical wave may be made extremely strong in comparison to the optical wave that is produced.

In particular, an Information Bearing First Optical Wave is first provided that has a certain shape which contains the information of interest. This may be accomplished, for example, by transferring the shape of one electromagnetic wave to the First Optical Wave by a center-wavelength changer, such that the First Optical Wave's power is encoded with the electromagnetic wave's temporal information. In any case, the Information Bearing First Optical Wave is combined with a Second Optical Wave and directed to co-propagate in a nonlinear Optical Material. The Information Bearing First Optical Wave is provided with a suitably high power to induce XPM upon the Second Optical Wave, imparting information contained in the Information Bearing First Optical Wave's time-dependent power onto the Second Optical Wave's temporal phase. The Information Bearing First Optical Wave may then be eliminated from the Second Optical Wave's subsequent path with a Splitter. In this manner, the Information Bearing First Optical Wave imparts its information onto the phase of the Second Optical wave using XPM. The key is that the phase shift can be arbitrarily large for any information strength, by tuning the power of the First Optical Wave. This phase shift is also independent of other properties of the optical waves, which may be independently optimized for the rest of the system.

The OITES of the inventor's apparatus, systems, and methods may comprise one or more of the following component modules, including a nonlinear optical material, optical wave sources, and combiners and splitters. The First and Second Optical Waves may originate from one or multiple lasers, and they can be continuous-wave or pulsed. The nonlinear optical material may be crystalline or amorphous materials, including but not limited to yttrium aluminum garnet. Combiners and splitters can distinguish the optical waves based on e.g. wavelength (using e.g. dichroic mirrors) or e.g. polarization (using e.g. polarizing beam splitters).

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 5A, 5B, 5C, 5D, and 5E show characteristics and the operation of another embodiment of an Optical Information Transfer Enhancer System (OITES) of the inventor's apparatus, systems, and methods.

DETAILED DESCRIPTION OF SPECIFIC EMBODIMENTS

Figure 1A:
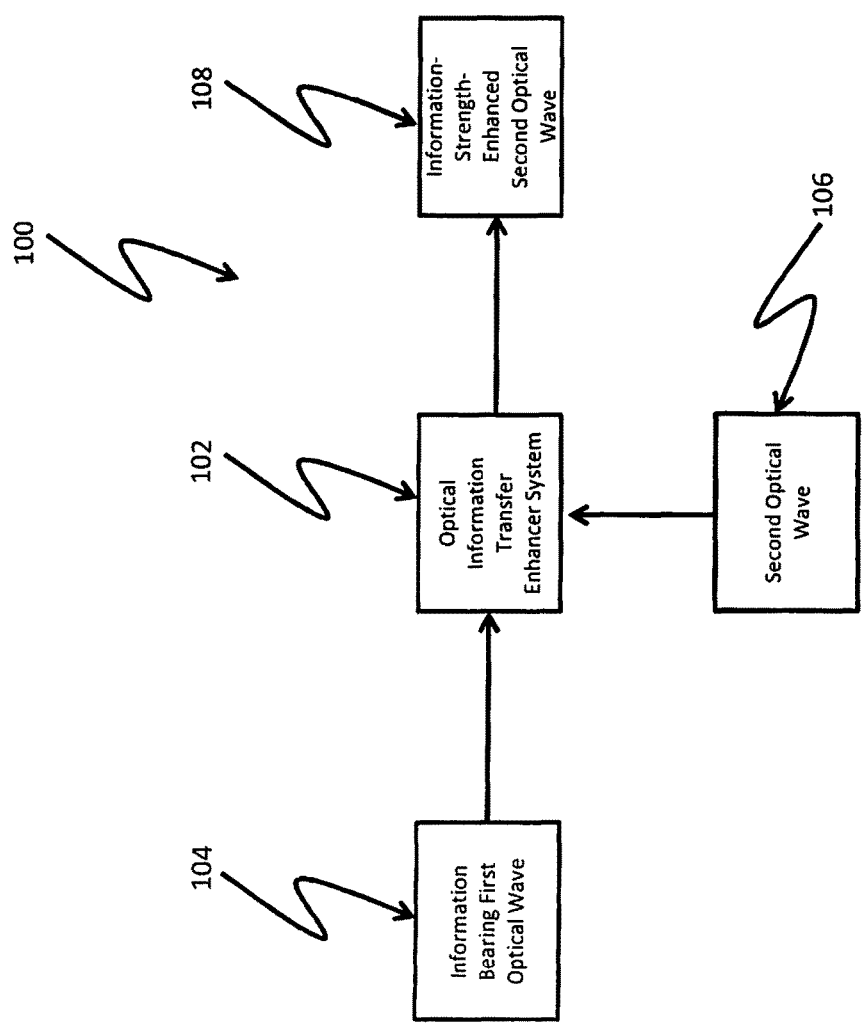
FIGS. 1A 1B, and 1C show characteristics and the operation of one embodiment of an Optical Information Transfer Enhancer System (OITES) of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

General Optical Information Transfer Enhancer System

Figure 1B:
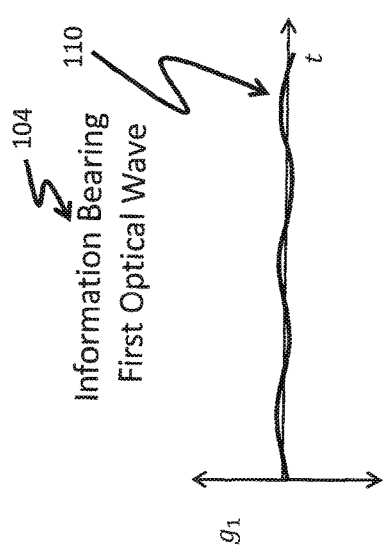
Figure 1C:
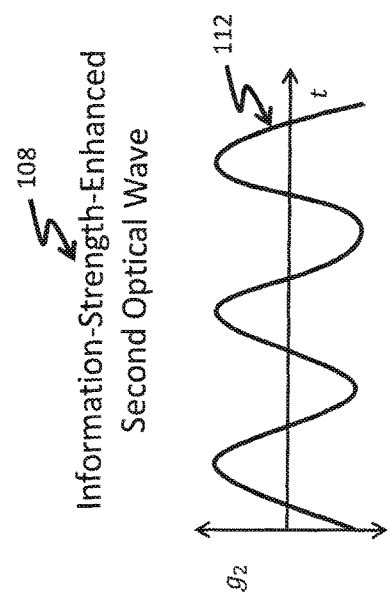

FIGS. 1A 1B, and 1C, illustrate the characteristics and operation of one embodiment of the inventor's apparatus, systems, and methods is illustrated. This embodiment is designated by the reference numeral 100. FIG. 1A shows the characteristics and operation of an Optical Information Transfer Enhancer System (OITES) 102 for enhancing the information present in and carried by an optical wave.

As illustrated in FIG. 1A, the OITES 102 is designed to receive an Information Bearing First Optical Wave 104 and a Second Optical Wave 106, wherein the OITES 102 causes the Information Bearing First Optical Wave 104 to impress upon the Second Optical Wave 106 its Information Shape with a greater Information Strength, resulting in an Information-Strength-Enhanced Second Optical Wave 108. FIG. 1B show the Information Bearing First Optical Wave 104. The Information Bearing First Optical Wave 104 includes a Generalized Information 110. FIG. 1C show the Information-Strength-Enhanced Second Optical Wave 108. The Information-Strength-Enhanced Second Optical Wave 108 includes an Information-Strength-Enhanced Generalized Information 112. The OITES 102 uses XPM to enhance the information strength of information on an optical wave by transferring the information of the optical wave onto another optical wave.

The Generalized Information is calculated from the temporal record of the Physical Information and depends on the Physical Information Type of interest (including but not limited to phase, polarization, and power) as shown in table 1 below. The Polarization Information angle θ is the phase delay between the two linear polarization components. The calculation of Information Strength here uses the maximum and minimum values of the Generalized Information over an entire given temporal record of interest.

TABLE 1

| Term | Phase Modulation | Polarization Modulation | Power Modulation |
|---|---|---|---|
| Physical Information Type | Phase | Polarization | Power |
| Physical Information | $x_i(t) = \varphi_i(t)$ for i = 1 or 2 | $x_i(t) = \theta_i(t)$ for i =1 or 2 | $x_i(t) = P_i(t)$ for t = 1 or 2 |
| Physical Average | $\langle x_i \rangle = \int x_i(t) \, dt / \int dt$ | | |
| Generalized Information | $g_i(t) = x_i(t) - \langle x_i \rangle$ | | $g_i(t) = (x_i(t) - \langle x_i \rangle)/x_i$ |
| Information Strength | $r_i = \left[\max_t(g_i(t)) - \min_t(g_i(t))\right]/2$ | | |
| Information Shape | $s_i(t) = g_i(t)/r_i$ | | |

The Information Shape of the Information-Strength-Enhanced Optical Wave 108 is substantially similar to the First Optical Wave 104, but can differ due to nonidealities (e.g. four-wave mixing and the nonlinear response of an interferometer) in the OITES. The Generalized describes a way of generalizing Physical Information independent of the Physical Information Type. This quantity is a useful measure of information since it is possible to transfer Phase Information to Power Information with an interferometer and keep Information Strength the same and Information Shape substantially the same. The shape of the First Optical Wave 104 and the Information-Strength-Enhanced Optical Wave 108 are substantially similar.

Certain Information Strengths have ramifications associated with them. π is the highest Information Strength for an interferometric information transfer device to remain unambiguous. 2π is the highest Information Strength for which the phase is known uniquely. Greater than 2π requires knowledge of at least one of two ranges of 2π the system is in to fully determine the information. Furthermore, greater than 4π requires distinguishing still further at least three ranges of 2π. Upon achieving the range above 6π encourages acquiring information of equal to or greater than 4 different levels of information. Finally, no fewer than five distinct levels are needed for anything above 8π.

Figure 2:
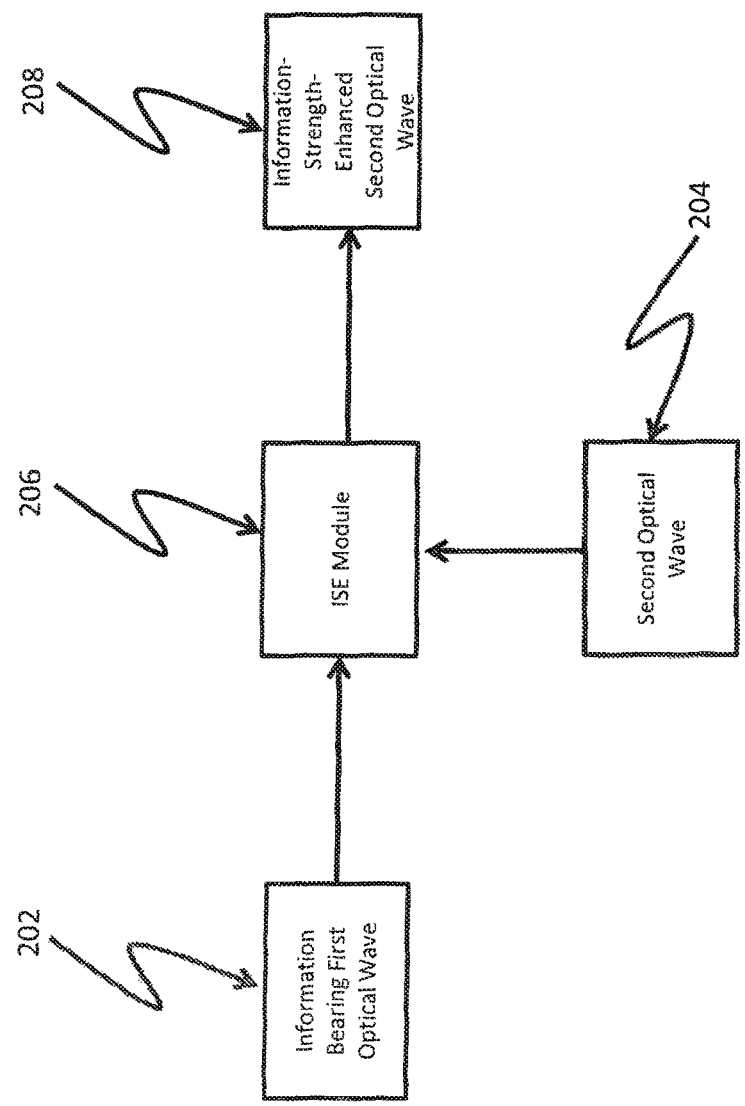
FIG. 2 shows the core component of the OITES.

The core component of the OITES is shown in FIG. 2 and is characterized as an Information Strength Enhancement (ISE) Module 206 which performs the core operation of increasing the Generalized Information of an Information Bearing First Optical Wave 202, so that the Information-Strength-Enhanced Second Optical Wave 208 has an Information Strength greater than that of the Information Bearing First Optical Wave 202. If the Information Bearing First Optical Wave 202 and Second Optical Wave 204 are co-polarized or orthogonally polarized, then the Information Bearing First Optical Wave 202 transfers the phase information of the Second Optical Wave 204 via XPM, proportional to the instantaneous power of the Information Bearing First Optical Wave. The effect is strongest if they are co-polarized and therefore in some embodiments co-polarization is preferred. In this modality, this particular embodiment transfers power information to phase information, and so may be known as a Power-Phase Optical Information Transfer Enhancer System or Power-Phase OITES. If however, the Second Optical Wave polarization is not co-polarized or orthogonally polarized (i.e. the polarizations are either (1) not the same or (2) not linearly polarized and 90 degrees apart), then the ISE Module 206 will make the Information Bearing First Optical Wave 202 impose a polarization rotation on the Second Optical Wave 204 that is proportional to the instantaneous power of the Information Bearing First Optical Wave. This then functions as a Power-Polarization Optical Information Transfer Enhancer System or Power-Polarization OITES.

Figure 3:
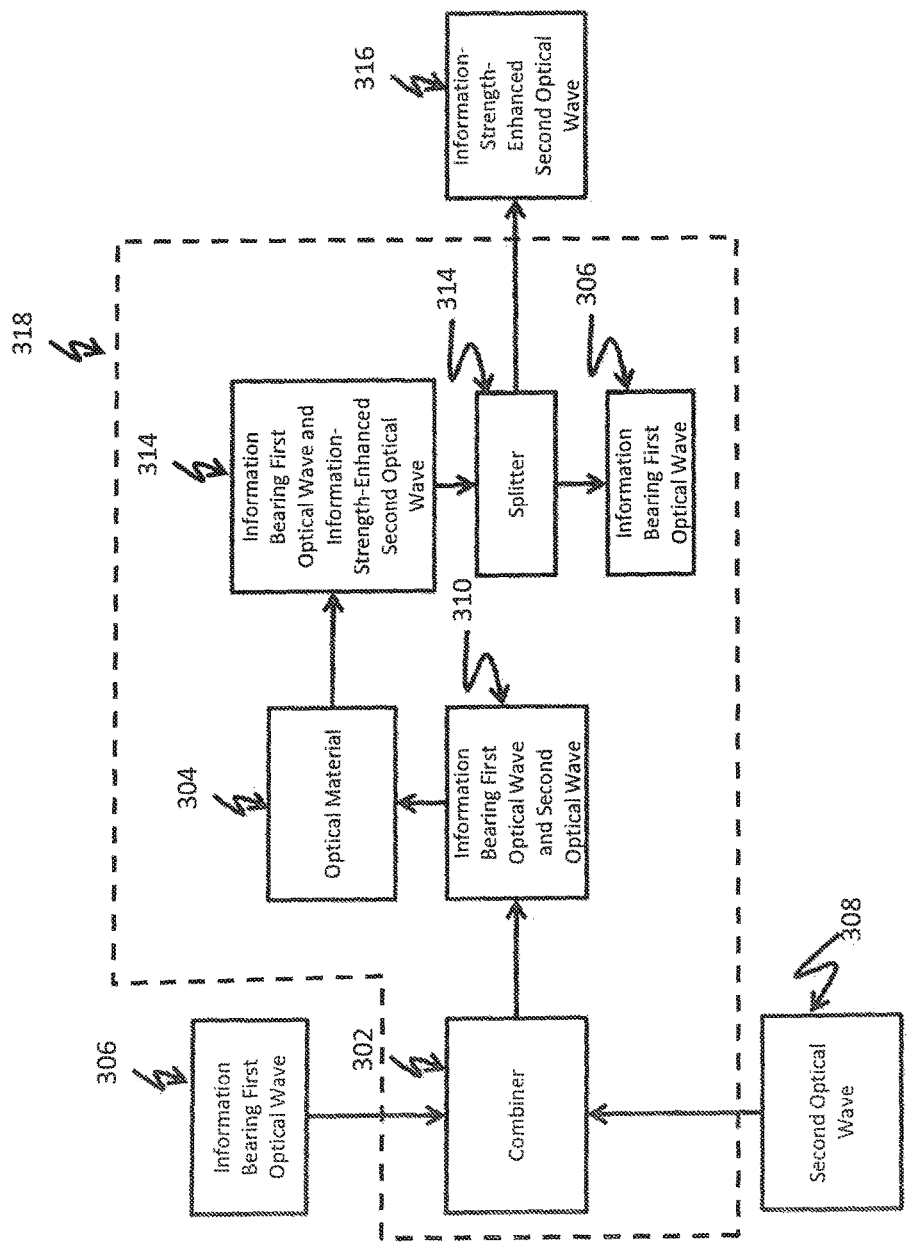
FIG. 3 shows one exemplary embodiment of a ISE Module.

FIG. 3 shows one exemplary embodiment of a ISE Module 300. The ISE Module 300 shown in FIG. 3 includes the following components: Combiner 302, Optical Material 304, Information Bearing First Optical Wave 306, Second Optical Wave 308, Information Bearing First Optical Wave and Second Optical Wave 310, Splitter 312, Information Bearing First Optical Wave and Information-Strength-Enhanced Second Optical Wave 314, and Information-Strength-Enhanced Second Optical Wave 316.

As shown, the ISE Module 300 includes a Combiner 302 and an Optical Material 304, wherein the Combiner 302 receives the First Optical Wave 306 and Second Optical Wave 308 and joins them together as "First Optical Wave and Second Optical Wave 310" to be sent to the Optical Material 304. The Optical Material 304 is preferably a nonlinear optical dielectric material, suitably adapted and engineered to cause a large enough phase change for an Information Bearing First Optical Wave and a Second Optical Wave.

Cross-phase modulation (XPM) is a third order nonlinear optical Kerr effect physical process whereby a material receives an information bearing first optical wave that is intense enough to cause the material to change the temporal phase of other coincident optical waves proportional to the temporal power of the first. In the simplest instantiation, the Information Bearing First Optical Wave causes a phase change to the Second Optical Wave by an amount $\Delta\phi_2 = 2\gamma P_1(t)L$, where $\gamma = 4\pi n n_2/(\lambda A_{eff})$ is the Kerr nonlinear coefficient of the interaction, n is the refractive index of the material, $n_2$ is the Kerr coefficient of the material, $\lambda$ is the wavelength the Information Bearing First Optical Wave, $A_{eff}$ is the effective area of the interaction, $P_1(t)$ is the time-varying power of the Information Bearing First Optical Wave, and L is the length of the interaction. For simplicity, the previous equation assumes no optical loss, linearly and co-polarized waves, all of which reduce the effect and can be included by simply adding a constant K<1 yielding $\Delta\phi_2 = 2K\gamma P_1(t)L$, and this value is precisely the amount by which the Information Strength is increased. If the waves are not linearly polarized, or are not co-polarized or orthogonally polarized, the Information Bearing First Optical Wave causes a nonlinear polarization rotation on the Second Optical Wave, yielding a Power-Polarization OITES. The ISE Module is suitably adapted and engineered by the aforementioned techniques to assure that the average phase change impressed upon the Second Optical Wave is larger than that of the Information Bearing First Optical Wave, so that the Information Strength (and hence Generalized Information) will be increased.

As shown in FIG. 3, the ISE Module 300 also includes a Splitter 312 following the Optical Material 304, and which allows the Information-Strength-Enhanced Second Optical Wave 316 to exit through one port as the output of the ISE Module 300, and the Information Bearing First Optical Wave 306 through another port but is no longer used. The Combiner 302 serves to combine the Information Bearing First Optical Wave 306 and Second Optical Wave 308 so that they both irradiate the Optical Material 304, and the Splitter serves to separate the Information Bearing First Optical Wave 306 from the Information-Strength-Enhanced Second Optical Wave 316. The Combiner 302 and Splitter 314 can combine and split the two optical waves by distinguishing them via e.g. polarization (in that case both of them can be implemented with e.g. polarization beam splitters), or by e.g. wavelength (in that case both of them can be implemented with e.g. dichroic mirrors). The Splitter 314 can also be a filter, since only the Information-Strength-Enhanced Second Optical Wave 316 output is needed.

Another embodiment of the ISE Module 410 includes a Mirror 408 which allows the Second Optical Wave 416 and Information Bearing First Optical Wave 402 to pass twice through the Optical Material 406 to further increase the information strength of the Information-Strength-Enhanced Second Optical Wave 414 as compared to passing through a single time. The Combiner 404 serves the same purpose as the Combiner 302 and the Splitter 312 for ISE Module 318 in FIG. 3 (this is possible because combiners are generally reciprocal devices and so act as splitters when the optical waves travel in reverse). The Nexus 412 is any device that redirects beams in the following fashion: from below, it is directed upwards (and possibly a fraction of the beam to the left or right depending on the slant angle analogous to beam splitters); from above, it is directed to the right (if a top-left to down-right slant angle; if the slant angle is otherwise, it is directed left; and in either case possibly a fraction of the beam is sent in the opposite direction); from the left, it is directed to the right (and possibly a fraction of the beam upwards to downwards depending on the slant angle analogous to beam splitters). Common beam splitters (polarization or not) and circulators are examples of a more general nexus. Note that an optical wave travelling in the opposite direction of the First Optical Wave 402 in the Optical Material 406 results in weaker Information Strength than if it were traveling in the same direction as the First Optical Wave 402. Also note that ISE Module 410 is also an embodiment of a Double-Pass ISE.

FIGS. 5A, 5B, 5C, 5D, and 5E FIGS. 5A, 5B, 5C, 5D, and 5E show characteristics and the operation of another embodiment of an Optical Information Transfer Enhancer System (OITES) of the inventor's apparatus, systems, and methods. The ISE Module 506 combines an Information Bearing First Optical Wave 502 and a Second Optical Wave 504 to produce a Information-Strength-Enhanced Second Optical Wave 508. The ISE Module 506 impresses an Information-Strength-enhanced version of the First Optical Wave's Generalized Information 510 onto the Second Optical Wave, resulting in a Physical Information $\phi_2(t)-\langle\phi_2\rangle$ phase information 512 and Generalized Information $g(t)=\phi_2(t)-\langle\phi_2\rangle$ 516 with Information Strength of the Second Optical Wave $d_2$ larger than that of the Signal Optical Wave $d_1$. Note the difference in definition of the phase and power Information Strength: as will be shown later, this quantity is conserved in converting phase information to power information in a perfect interferometer. Since phase Generalized Information does not depend on the average phase, there is a broken y-axis in FIG. 5D. Polarization information transfer is also possible if the Second Optical Wave is launched at a polarization angle that is not co-polarized or orthogonally polarized to the First Optical Wave. Rather than just incurring a time dependent phase delay, this delays the two polarizations of the Second Optical Wave differently, which changes the state (and hence angle) of polarization over time.

FIGS. 6A, 6B, 6C, 6D, and 6E show the principal of operation of a Power-Power OITES. The ISE Module 604 combines an Information Bearing First Optical Wave 602 and a Second Optical Wave 606 to produce an Information-Strength-Enhanced Second Optical Wave 608. The Information-Strength-Enhanced Second Optical Wave and Third Optical Wave 610 are combined in the Beam Splitter 612 to produce a Power-Information-Strength-Enhanced Second Optical Wave. A Beam Splitter is an optical device that passes one fraction of light and reflects the other. The line in the Beam Splitter box represents the reflective surface in a corresponding free space beam splitter (but implementations are not explicitly limited to free space beam splitters), so that e.g. an upper-left to bottom-right line means that e.g. a wave coming from the bottom is split between going up and to the left, and a wave coming from the left is split between going down and to the right, resulting in interfered waves going down and to the right. It should be noted that the Information Strength of the Power-Information-Strength-Enhanced Second Optical Wave 614 will be less than or equal to that of the Information-Strength-Enhanced Second Optical Wave 608, and strictly equal only if the Third Optical Wave 610 has the same average power, polarization, and wavelength as the Information-Strength-Enhanced Second Optical Wave 608. In other words, Information Strength cannot be improved through a Beam Splitter, while it can be increased through an ISE Module. Also, that means the ISE Module may need to be engineered to result in a Information Strength improvement larger than that of the Power-Power OITES to compensate nonidealities in the operation of the Beam Splitter 612.

Figure 7:
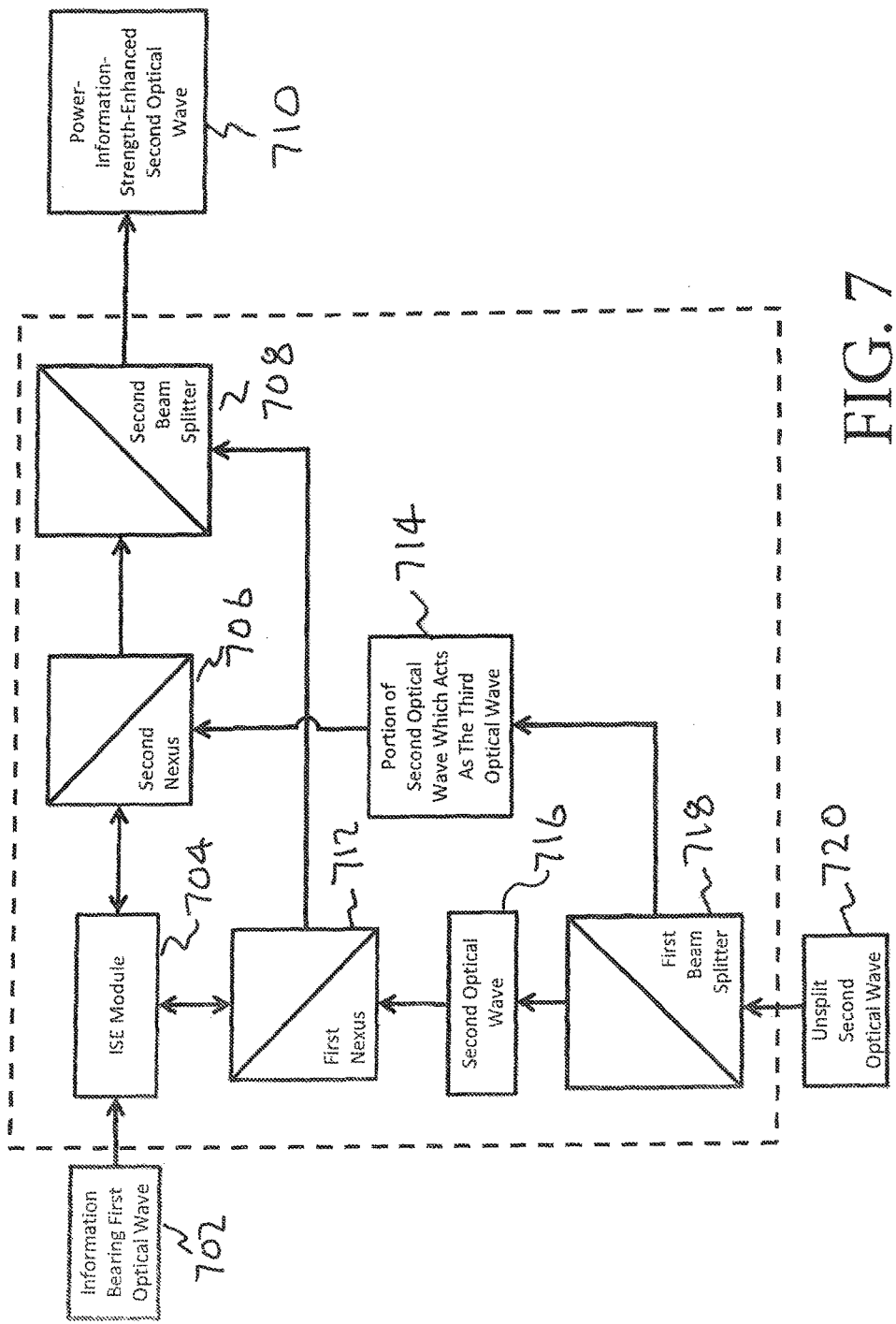
FIG. 7 shows another exemplary embodiment of an Optical Information Transfer Enhancer System (OITES) of the inventor's apparatus, systems, and methods.

FIG. 7 shows one embodiment of a Power-Power OITES. An Unsplit Second Optical Wave 720 encounters a First Beam Splitter 718 which splits the Unsplit Second Optical Wave 720 into a Second Optical Wave 716 and a Portion of Second Optical Wave Which Acts As The Third Optical Wave 714. The Second Optical Wave 716 encounters a First Nexus 712 which passes through to the ISE Module 704, exits the right side of the ISE Module, passes through the Second Nexus 706, interferes with the Portion of Second Optical Wave Which Acts As The Third Optical Wave, and produces the Power-Information-Strength-Enhanced Second Optical Wave 710. The Portion of Second Optical Wave Which Acts As The Third Optical Wave 714 encounters the Second Nexus 706, is directed towards the ISE Module 704, down to the First Nexus 712, and into the Second Beam Splitter 708.

Figure 4:
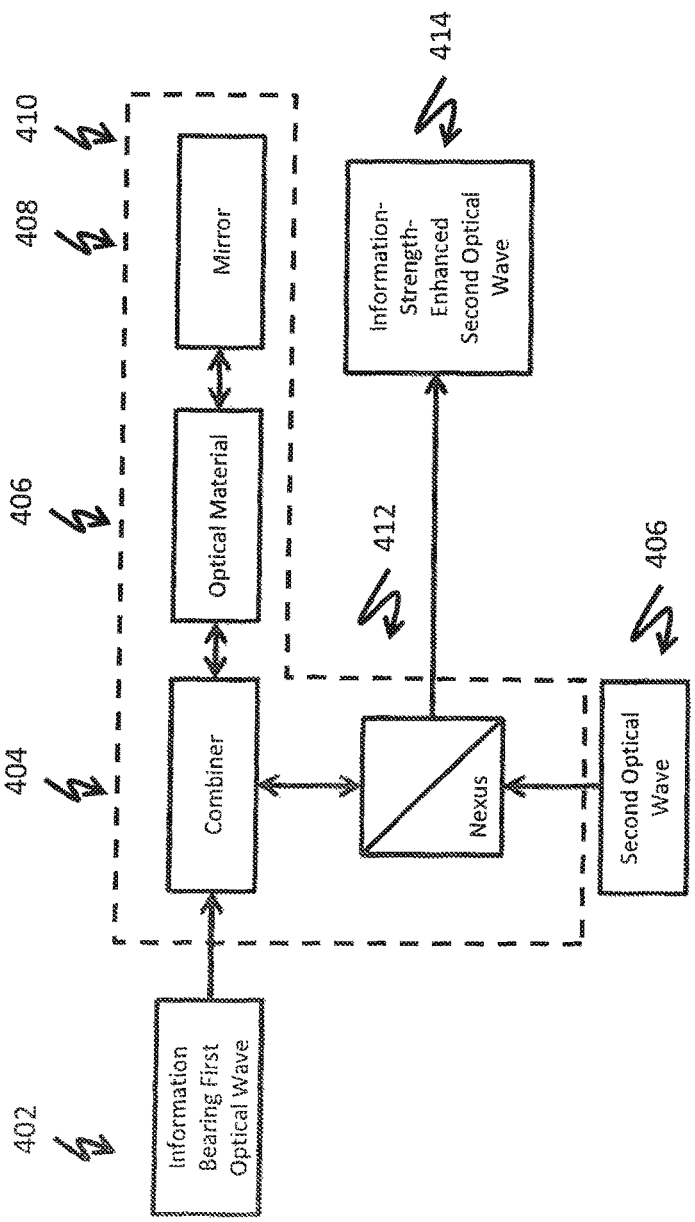
FIG. 4 shows another exemplary embodiment of an Optical Information Transfer Enhancer System (OITES) of the inventor's apparatus, systems, and methods.
Figure 5B:
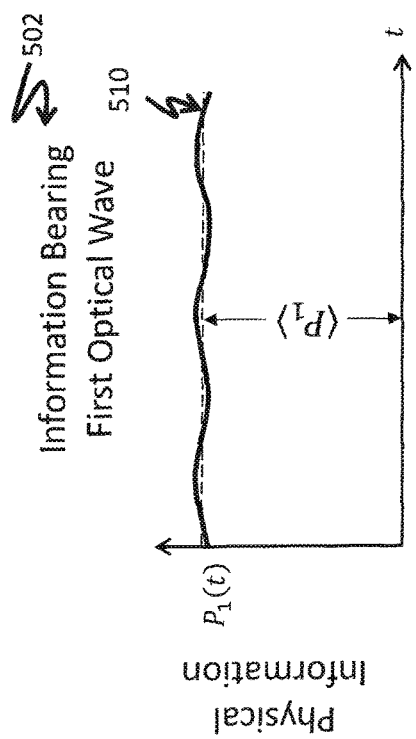
Figure 5C:
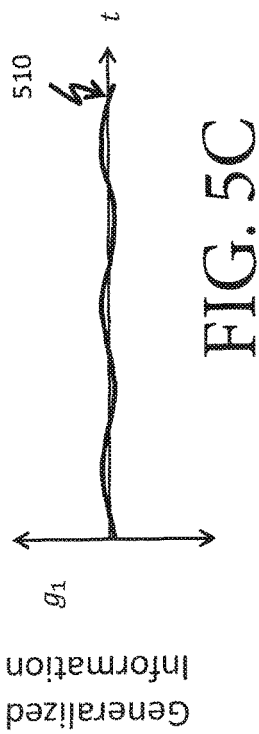
Figure 6A:
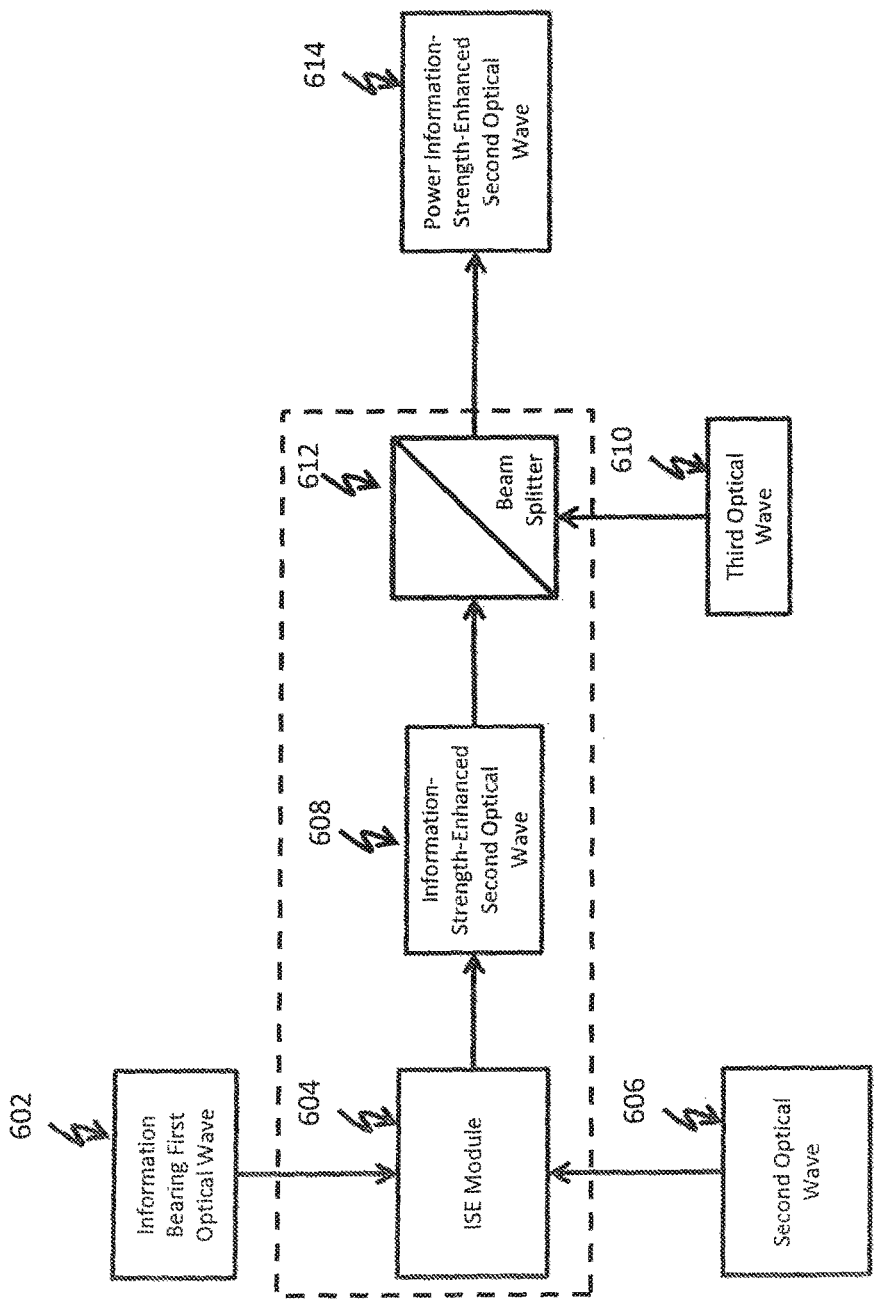
FIGS. 6A, 6B, 6C, 6D, and 6E show characteristics and the operation of yet another embodiment of an Optical Information Transfer Enhancer System (OITES) of the inventor's apparatus, systems, and methods.
Figure 6B:
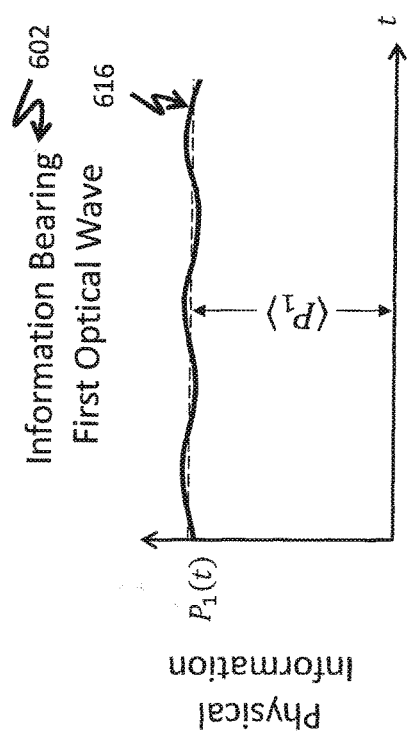
Figure 6C:
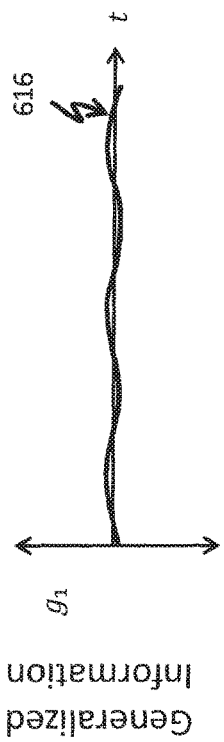
Figure 6D:
Figure 6D:
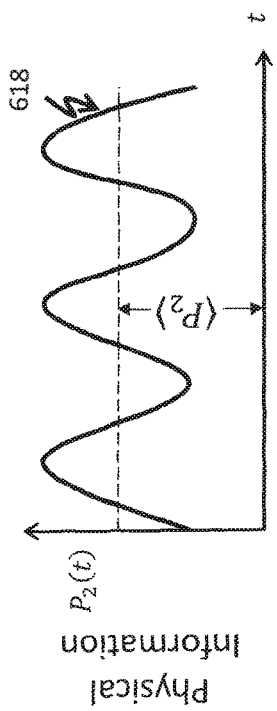
Figure 6E:
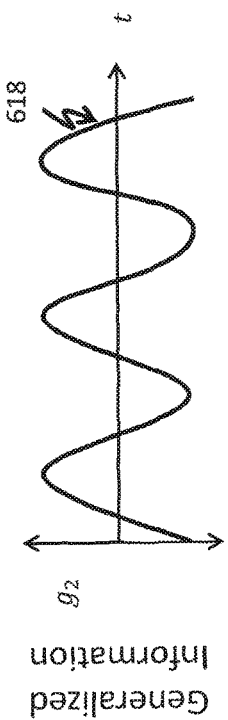
Figure 8:
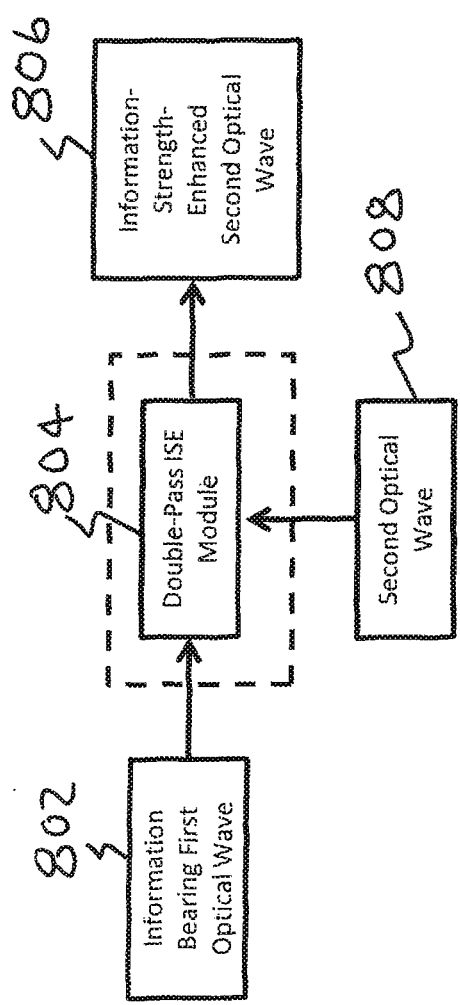
FIG. 8 shows yet another exemplary embodiment of an Optical Information Transfer Enhancer System (OITES) of the inventor's apparatus, systems, and methods.

FIG. 8 shows one embodiment of an OITES. A First Optical Wave 802 and a Second Optical Wave are coupled into a Double-Pass ISE 804 (one exemplary embodiment being FIG. 4), and from the Double-Pass ISE is produced a Information-Strength-Enhanced Second Optical Wave 806.

Figure 9:
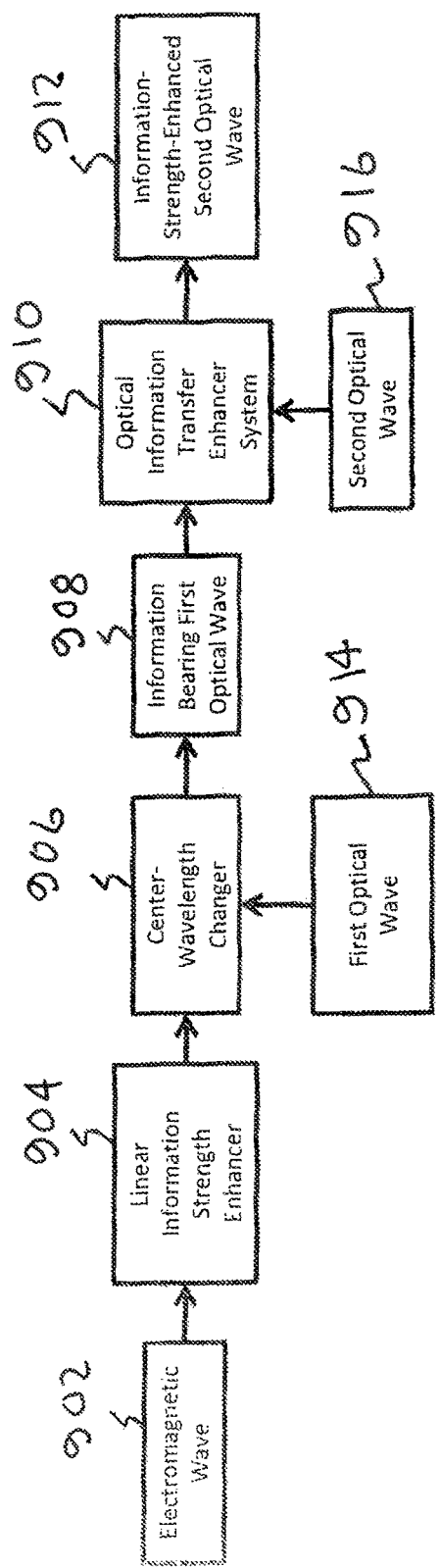
FIG. 9 shows another exemplary embodiment of an Optical Information Transfer Enhancer System (OITES) of the inventor's apparatus, systems, and methods.

FIG. 9 shows one embodiment of an OITES. An Electromagnetic Wave 902 feeds an Linear Information Strength Enhancer 904 which is a device that increases the Information Strength of said Electromagnetic Wave without altering its shape. The output has its information transferred to a First Optical Wave 914 by a Center-Wavelength Changer 906, producing an Information Bearing First Optical Wave 908. A Center-Wavelength Changer is any device that imparts information from an electromagnetic wave onto an optical wave, and could comprise e.g. a semiconductor or a dielectric material, and transmit this information via e.g. a free electron nonlinearity or a bound electron nonlinearity. If the Center-Wavelength Changer material does not change the power information of the First Optical Wave, the Center-Wavelength Changer would also comprise an interferometer so that the Center-Wavelength Changer alters the power information of the First Optical Wave, producing an Information Bearing First Optical Wave. This Information Bearing First Optical Wave joins a Second Optical Wave 916 in an Optical Information Transfer Enhancer System 910, producing an Information-Strength-Enhanced Second Optical Wave 912.

Figure 10:
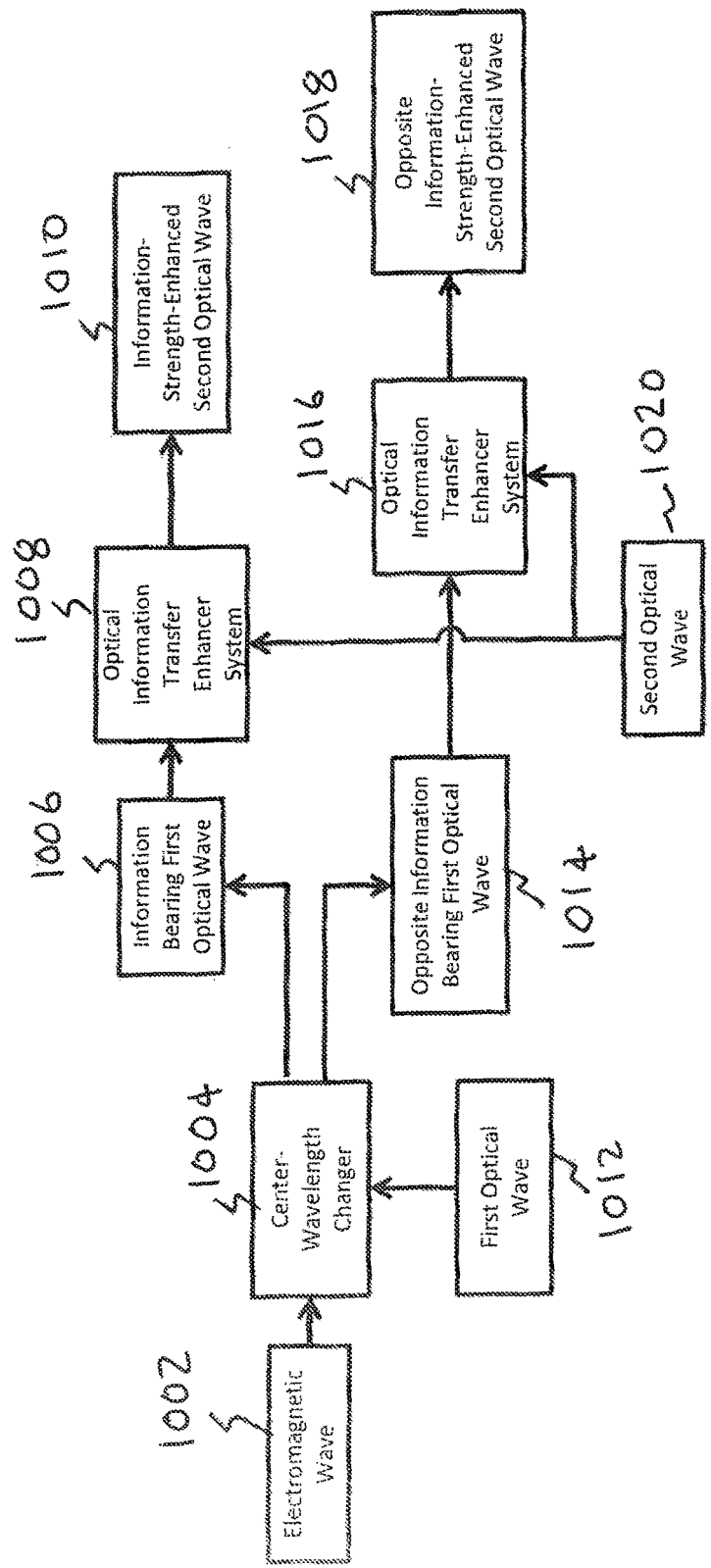
FIG. 10 shows yet another exemplary embodiment of an Optical Information Transfer Enhancer System (OITES) of the inventor's apparatus, systems, and methods.

FIG. 10 shows yet another embodiment of an OITES. An Electromagnetic Wave 1002 has its center-wavelength changed to that of a First Optical Wave 1012 via a Center-Wavelength Changer 1004. Certain center-wavelength changers, especially interferometric ones, produce two opposite outputs (i.e. at any given time, one output is lighter when the other is darker), and one of these outputs will be associated with the term Opposite. One output of the Center-Wavelength Changer 1004 is an Information Bearing First Optical Wave 1006 which joins a Second Optical Wave 1020 in an Optical Information Transfer Enhancer System 1008 to produce a Information-Strength-Enhanced Second Optical Wave 1010. The other output of the Center-Wavelength Changer 1004 is an Opposite Information Bearing First Optical Wave 1014 which joins a Second Optical Wave 1020 in an Optical Information Transfer Enhancer System 1016 to produce an Opposite Information-Strength-Enhanced Second Optical Wave 1018.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An optical information transfer enhancer apparatus, comprising:
   a first system for producing an information bearing first optical wave that is impressed with a first information having a first information strength, wherein said first optical wave has a first shape;
   a second system for producing a second optical wave; and
   an information strength enhancer module that receives said first optical wave and said second optical wave and impresses said first optical wave upon said second optical wave via cross-phase modulation (XPM) to produce an information-strength-enhanced second optical wave having a second shape and a second information strength that is greater than said first information strength of said first optical wave wherein said information strength enhancer module includes
   a combiner connected to said first system for producing an information bearing first optical wave and connected to said second system for producing a second optical wave that produces a combined first optical wave and second optical wave,
   an optical material that receives said combined first optical wave and second optical wave and produces an information bearing first optical wave and information-strength-enhanced second optical wave, and
   a splitter that that receives said information bearing first optical wave and information-strength-enhanced second optical wave and produces information-strength-enhanced second optical wave.

2. The optical information transfer enhancer apparatus of claim 1 wherein said second information strength is more than $\pi$ times greater than said first information strength of said first optical wave.

3. The optical information transfer enhancer apparatus of claim 1 wherein said second information strength is more than $2\pi$ times greater than said first information strength of said first optical wave.

4. The optical information transfer enhancer apparatus of claim 1 wherein said second information strength is more than $4\pi$ times greater than said first information strength of said first optical wave.

5. The optical information transfer enhancer apparatus of claim 1 wherein said second information strength is more than $6\pi$ times greater than said first information strength of said first optical wave.

6. The optical information transfer enhancer apparatus of claim 1 wherein said second information strength is more than $8\pi$ times greater than said first information strength of said first optical wave.

7. The optical information transfer enhancer apparatus of claim 1 wherein said first system for producing an information bearing first optical wave includes a system for center-wavelength-changing an electromagnetic wave into that of said first optical wave to impress said first optical wave with said first information having said first information strength.

8. The optical information transfer enhancer apparatus of claim 1 wherein said information strength enhancer module comprises a combiner and a nonlinear optical material, wherein said combiner is adapted to receive and multiplex said first optical wave and said second optical wave as input into said nonlinear optical material, and wherein said nonlinear optical material produces said information-strength-enhanced second optical wave as output.

9. The optical information transfer enhancer apparatus of claim 1, further comprising
   a third optical wave; and
   a beam splitter arranged to receive and interfere said information-strength-enhanced second optical wave with said third optical wave so as to produce a power-information-strength-enhanced second optical wave.

10. An optical information transfer enhancer apparatus, comprising:
    a first system for producing an information bearing first optical wave that is impressed with a first information having a first information strength, wherein said first optical wave has a first shape;
    a second system for producing a second optical wave; and
    a double-pass information strength enhancer module that receives said first optical wave and said second optical wave and impresses said first optical wave upon said second optical wave via cross-phase modulation (XPM) to produce an information-strength-enhanced second optical wave having a second shape and a second information strength that is greater than said first information strength of said first optical wave wherein said information strength enhancer module includes
    a combiner connected to said first system for producing an information bearing first optical wave and connected to said second system for producing a second optical wave that produces a combined first optical wave and second optical wave,
    an optical material that receives said combined first optical wave and second optical wave and produces an information bearing first optical wave and information-strength-enhanced second optical wave, a mirror operatively connected to said optical material that allows said second optical wave and said information bearing first optical wave to pass twice through said optical material, and a splitter that receives said information bearing first optical wave and information-strength-enhanced second optical wave and produces information-strength-enhanced second optical wave.

* * * * *